US009751971B2

(12) United States Patent
Veit et al.

(10) Patent No.: US 9,751,971 B2
(45) Date of Patent: Sep. 5, 2017

(54) DISPERSING RESINS FOR PIGMENT PREPARATIONS HAVING A LOW VOLATILE ORGANIC CONTENT

(71) Applicants: Thomas Veit, Hagen (DE); Michael Ewald, Marl (DE); Daniel Engelke, Dorsten (DE); Bettina Burian, Dorsten (DE); Heiko Alzer, Muelheim an der Ruhr (DE); Jan Schwarze, Bottrop (DE); Ellen Reuter, Bochum (DE); Frank Kleinsteinberg, Alpen (DE); Katrin Roland, Essen (DE); Sandra Roediger, Bochum (DE); Erika Retzlaff, Marl (DE); Sylvia Kroes, Marl (DE)

(72) Inventors: Thomas Veit, Hagen (DE); Michael Ewald, Marl (DE); Daniel Engelke, Dorsten (DE); Bettina Burian, Dorsten (DE); Heiko Alzer, Muelheim an der Ruhr (DE); Jan Schwarze, Bottrop (DE); Ellen Reuter, Bochum (DE); Frank Kleinsteinberg, Alpen (DE); Katrin Roland, Essen (DE); Sandra Roediger, Bochum (DE); Erika Retzlaff, Marl (DE); Sylvia Kroes, Marl (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/628,991

(22) Filed: Feb. 23, 2015

(65) Prior Publication Data

US 2015/0240020 A1   Aug. 27, 2015

(30) Foreign Application Priority Data

Feb. 24, 2014 (DE) ........................ 10 2014 203 231

(51) Int. Cl.
| | | |
|---|---|---|
| *C08G 6/02* | (2006.01) | |
| *C09B 67/00* | (2006.01) | |
| *C09D 161/02* | (2006.01) | |
| *C09D 5/02* | (2006.01) | |
| *C09D 17/00* | (2006.01) | |
| *C09B 67/46* | (2006.01) | |
| *C08G 2/20* | (2006.01) | |
| *C08G 2/18* | (2006.01) | |
| *C09D 161/00* | (2006.01) | |

(52) U.S. Cl.
CPC .............. *C08G 6/02* (2013.01); *C09B 67/009* (2013.01); *C09D 5/027* (2013.01); *C09D 17/00* (2013.01); *C09D 17/002* (2013.01); *C09D 161/02* (2013.01)

(58) Field of Classification Search
CPC ....................................................... C08G 6/02
USPC ......... 528/227, 222, 223, 224; 524/592, 593
See application file for complete search history.

(56) References Cited

U.S. PATENT DOCUMENTS

| | | | |
|---|---|---|---|
| 2,363,829 A | 11/1944 | Caplan et al. | |
| 7,781,538 B2 | 8/2010 | Glöckner et al. | |
| 7,812,109 B2 | 10/2010 | Gloeckner et al. | |
| 2002/0019459 A1 | 2/2002 | Albrecht et al. | |
| 2006/0074217 A1 | 4/2006 | Gloeckner et al. | |
| 2008/0255316 A1 | 10/2008 | Wenning et al. | |
| 2009/0099332 A1 | 4/2009 | Glockner et al. | |
| 2009/0198024 A1 | 8/2009 | Glöckner et al. | |

FOREIGN PATENT DOCUMENTS

| | | |
|---|---|---|
| AU | 24251/67 A | 1/1969 |
| GB | 629481 A | 9/1949 |
| WO | WO 2006/097378 A1 | 9/2006 |

OTHER PUBLICATIONS

European Search Report issued Jun. 29, 2015 in Patent Application No. 15153043.3 (with English Translation of Category of Cited Documents).
David F. Gould, "Phenolic Resins" Reinhold Plastics Applications Series, XP002710765, Jan. 1, 1959, 3 Pages.

*Primary Examiner* — Duc Truong
(74) *Attorney, Agent, or Firm* — Oblon, McClelland, Maier & Neustadt, L.L.P.

(57) ABSTRACT

A dispersing resin for conventional solventborne pigment preparations having a low to very low proportion of volatile organic substances is provided. Further provided are solventborne coating materials containing the dispersing resin. Uses include paints, varnishes, adhesives, inks or printing inks, and compositions for coloring of plastics. The pigment preparations produced with these resins are free of yellowing, stable to weathering, of low viscosity and intensely colored.

14 Claims, No Drawings

DISPERSING RESINS FOR PIGMENT PREPARATIONS HAVING A LOW VOLATILE ORGANIC CONTENT

CROSS REFERENCE TO RELATED APPLICATIONS

This application claims priority to German Application No. 102014203231.8, filed Feb. 24, 2014, the disclosure of which is incorporated herein by reference in its entirety.

BACKGROUND OF THE INVENTION

Field of the Invention

The present invention relates to dispersing resins for conventional solventborne pigment preparations having a low to very low proportion of volatile organic substances, and to the use thereof in solventborne coating materials, for example paints, varnishes, adhesives, inks or printing inks, and for colouring of plastics. The pigment preparations produced with these resins are free of yellowing, stable to weathering, of low viscosity and intensely coloured.

For the reliable dispersion and stabilization of pigments in coating systems, dispersants are generally used, in order thus to reduce the mechanical shear forces required for effective dispersion of the solids, and simultaneously to achieve maximum filler levels. The dispersants promote the breakup of agglomerates and, being surface-active materials, wet and cover the surface of the particles to be dispersed and stabilize them against unwanted reagglomeration. The stabilization of the pigments is of great significance in the coatings industry, since pigments, being an important formulation constituent, determine the visual appearance and the physicochemical properties of a coating. In order that they can display their action to an optimal degree in the coating, they have to be homogeneously and finely distributed in the varnish during the dispersion process. The distribution has to be stabilized, in order that this state is maintained in the course of production, storage, processing and subsequent film formation. Recombination of the primary particles and aggregates can lead to formation of sediment, increasing viscosity, losses of gloss, inadequate colour depth, low hiding capacity, phase separation of the pigments and poor reproducibility of colour shades.

Pigments in aqueous pigment preparations are stabilized exclusively by wetting agents and dispersants, whereas dispersion in solventborne pigment preparations may conventionally be promoted by dispersing resins (Brock, Groteklaes, Mischke, Lehrbuch der Lacktechnologie [Coatings Technology], Vincentz Verlag Hannover 1998, p. 240). Traditionally, binder-containing pigment concentrates are used in solventborne coating systems. Dispersing resins are employed in such systems in order to assure broad compatibility and hence usability of the concentrates [Glockner et al., Farbe and Lack 2 (2010) 19]. These resins must have low intrinsic colour and simultaneously broad solubility in a wide variety of different solvents and binders.

Examples of such dispersing resins—also called grinding resins—include urea-aldehyde resins, ketone-aldehyde resins and polyurethane resins. Urea-aldehyde resins feature broad solubility and compatibility, high pigment binding capacity and low solution viscosity [Stoye, Freitag, Lackharze (Resins for Coatings), Carl Hanser Verlag Munich Vienna 1996, p. 174 ff.]. Also suitable as grinding resins are ketone-aldehyde resins, for example based on trimethylcyclohexanone. In relation to pigment binding capacity and solution viscosity, they actually surpass the urea-aldehyde resins [Stoye, Freitag, Lackharze, Carl Hanser Verlag Munich Vienna 1996, p. 174 ff.]. U.S. Pat. No. 8,017,686 describes polyurethane resins as grinding resins, but only for aqueous systems.

However, conventionally known grinding resins are unsuitable for various reasons for the production of solventborne pigment preparations having a low to very low proportion of volatile organic substances.

Urea-aldehyde resins such as BASF's Laropal® A81 are solid at 23° C. and a pressure of 101,325 Pa. The low viscosity necessary can be achieved only through addition of solvents. Given that a solvent content of up to 50% by weight is often necessary to achieve a processible solution viscosity of the solid resin, it is thus impossible to formulate specifically modern low-solvent coating compositions.

Mixtures of ketone-aldehyde resins with polyethers, such as Tego® VariPlus UC from Evonik Industries, are liquid at 23° C. and 101,325 Pa. The flowability of Tego® VariPlus UC derives solely from the presence of polyethers in the mixture, which again leads to an unwanted effect of diluting the actual resin. Furthermore, the product is not stable to yellowing and thermally stable to the desired extent in many cases. The use of this resin in coatings can therefore lead to discolouration in the coating over time.

It is therefore an object of the present invention to provide a grinding resin which allows the production of low-solvent pigment preparations for low-solvent coatings, and at the same time has improved performance properties.

SUMMARY OF THE INVENTION

This and other objects have been achieved according to the present invention, the first embodiment of which includes a ketone-aldehyde condensation resin, comprising: a condensation product of an aliphatic ketone and an aldehyde; wherein a molar ratio of the aliphatic ketone to the aldehyde is from 1/1.5 to 1/2.5, and the condensation resin is free-flowing at a temperature of 23° C. and a pressure of 101,325 Pa.

In another embodiment the present invention includes a process for preparing the ketone-aldehyde condensation resin of the first embodiment, comprising: condensing the aliphatic ketone with the aldehyde with an alkaline catalyst; wherein a molar ratio of the aliphatic ketone to the aldehyde is from 1/1.5 to 1/2.5.

In another embodiment, the present invention also includes a pigment dispersion comprising: a pigment; and the ketone-aldehyde condensation resin of the first embodiment.

The forgoing description is intended to provide a general introduction and summary of the present invention and is not intended to be limiting in its disclosure unless otherwise explicitly stated. The presently preferred embodiments, together with further advantages, will be best understood by reference to the following detailed description

DETAILED DESCRIPTION OF THE PREFERRED EMBODIMENTS

As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. Where a numerical limit or range is stated, the endpoints are included. Also, all values and subranges within a numerical limit or range are specifically included as if explicitly written out.

The inventive condensation of at least one aldehyde and at least one CH-acidic ketone surprisingly affords free-flowing grinding resins, also called condensation resins hereinafter, with which it is possible to produce pigment preparations for low-solvent coatings. At the same time, the inventive grinding resins do not affect important varnish properties such as film hardness, drying rate, compatibility and yellowing resistance. Thus, the inventive resins have yellowing stability and thermal stability in particular. Moreover, the inventive resins may be used without addition of liquefying components, for example solvents or polyethers, since the inventive resins are free-flowing per se. A further advantage is that no urea need be present in the inventive resins.

Thus in a first embodiment the present invention provides a ketone-aldehyde condensation resin, comprising: a condensation product of an aliphatic ketone and an aldehyde; wherein a molar ratio of the aliphatic ketone to the aldehyde is from 1/1.5 to 1/2.5, and the condensation resin is free-flowing at a temperature of 23° C. and a pressure of 101,325

In the context of the present invention, it is essential that the molar ratio of ketone to aldehyde be in the range from 1:1.5 to 1:2.5, especially in the range from 1:1.7 to 1:2.2. It is surprising to the person skilled in the art that free-flowing condensation resins which are obtained in these selected molar ratio ranges are particularly suitable for use as dispersing resins.

Suitable aldehydes for preparation of the inventive condensation resins include unbranched or branched aldehydes, preferably selected from the group consisting of formaldehyde, acetaldehyde, n-butyraldehyde and/or isobutyraldehyde, valeraldehyde and dodecanal, or mixtures thereof. In a particularly preferred embodiment, formaldehyde is present as aldehyde in the inventive resins, either alone or in mixtures with the aforementioned aldehydes. It is also possible to use formaldehyde condensates such as trioxane or paraformaldehyde, preference being given to the use of paraformaldehyde. The formaldehyde required may also be used, for example, as an about 20% to 40% by weight aqueous or alcoholic (e.g. methanol or butanol) solution. In the context of the present invention, it is especially also possible to use different forms of formaldehyde, for example a combination of paraformaldehyde and a solution.

Suitable ketones for preparation of the inventive condensation resins include any conventionally known CH-acidic ketones or mixtures thereof, for example acetone, acetophenone, methyl ethyl ketone, pentan-3-one, cyclopentanone, cyclododecanone, mixtures of 2,2,4- and 2,4,4-trimethylcyclopentanone, cycloheptanone, cyclooctanone, cyclohexanone and alkyl-substituted cyclohexanones such as 4-tert-amylcyclohexanone, 2-sec-butylcyclohexanone, 2-tert-butylcyclohexanone, 4-tert-butylcyclohexanone, 2-methylcyclohexanone and 3,3,5-trimethylcyclohexanone.

Especially preferably, the ketones may be selected from the group consisting of methyl ethyl ketone, heptan-2-one, heptan-3-one, heptan-4-one, octan-2-one, octan-3-one, undecan-2-one, 5-methylhexan-2-one (methyl isoamyl ketone) and 2-methylpentan-4-one (methyl isobutyl ketone) or mixtures thereof.

In one embodiment, the inventive resins do not contain urea. In other embodiments blending the resins with liquefying components, for example solvents or polyethers, may nt be necessary since the inventive resins are free-flowing per se.

The inventive resins generally have glass transition temperatures of 0° C. or less, especially of 0° C. to −28° C., preferably of −5° C. to −20° C., more preferably −10° C. to −16° C., determined to DIN 53765.

The inventive resins may have relative molar masses between 350 and 900 g/mol, preferably between 400 and 800 g/mol, more preferably between 450 and 750 g/mol.

The relative molar masses may be determined by size exclusion chromatography (SEC). For this purpose, three columns from Merck (PS 400, 250*7 mm, PS 40, 250*7 mm, and PS 1, 250*7 mm) with a particle size of 5 μm are combined in series. After calibration, 20 μl of the condensation resin solution in tetrahydrofuran (c of condensation resin=20 mg/ml) are injected at 40° C. with a Rheodyne 7125 injector and analysed at a flow rate of 1 ml/min (Waters 510 HPLC pump) at 40° C. with degassed tetrahydrofuran as mobile phase and a differential refractometer at 40° C. (Waters model 410). Evaluation is effected after calibration against polystyrene standards, which is conducted in the manner described above. Polystyrene standards (standard 1 Mp 377400, Mp 96000, Mp 20650, Mp 1300, Mp 162; standard 2 Mp 283300, Mp 50400, Mp 10850, Mp 2930, Mp 980; standard 3 Mp 218800, Mp 68900, Mp 10050, Mp 1940, Mp 580; Mp=molar mass at peak maximum) are commercially available, for example, from Merck or Polymer Laboratories.

The inventive condensation resins of this composition have viscosities (93% by weight in butyl acetate) of 5 Pas to 50 Pas, preferably of 10 Pas to 40 Pas and more preferably of 20 Pas to 35 Pas, measured with an Anton Paar M102 rotary viscometer and the CP50/2 measurement geometry at 23° C. and a shear rate of 1/100 s.

In a very particularly preferred embodiment of the present invention, the resin comprises 2-methylpentan-4-one as ketone component and formaldehyde as aldehyde component in a ratio of 1:1.7 to 1:2.2. These particularly preferred resins have glass transition temperatures of 0° C. to −28° C., preferably of −5° C. to −20° C., more preferably −10° C. to −16° C., determined to DIN 53765, relative molar masses Mn between 350 and 900 g/mol, preferably between 400 and 800 g/mol, more preferably between 450 and 750 g/mol, and viscosities (93% by weight in butyl acetate) of 5 Pas to 50 Pas, preferably of 10 Pas to 40 Pas and more preferably of 20 Pas to 35 Pas.

The present invention likewise provides processes for preparing the inventive resins, comprising condensing the aliphatic ketone with the aldehyde with an alkaline catalyst; wherein a molar ratio of the aliphatic ketone to the aldehyde is from 1/1.5 to 1/2.5.

For resin synthesis, all known processes may be employed. Typically, condensation is effected in the presence of alkaline catalysts at temperatures between 75 and 95° C. Such reactions are described, for example, in Ullmann's Encyclopädie der technischen Chemie [Ullman's Encyclopedia of Industrial Chemistry] vol. 12, Verlag Chemie Weinheim, 1976, pages 547 to 555.

The reaction in processes according to the present invention may preferably be conducted in a basic medium. Catalysts used for the polycondensation are especially strongly basic compounds. Basic catalysts according to the present invention include alkali metal hydroxides and alkali metal methoxides, for example potassium hydroxide, sodium hydroxide, potassium methoxide or sodium methoxide. Further basic catalysts usable with preference include quaternary ammonium compounds such as tetramethylammonium hydroxide, tetraethylammonium hydroxide or tetrabutylammonium hydroxide.

The basic catalysts may be used especially in amounts of ≥0.025 mol %, preferably ≥0.05 mol %, and especially in amounts of ≥0.10 mol %, based on the ketone, in the reaction mixture.

In a further preferred embodiment of the present invention, a phase transfer catalyst of the formula

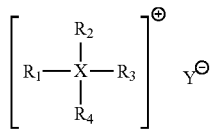

is used for the condensation, where X is a nitrogen or phosphorus atom, R1 is a phenyl or benzyl radical, R2, R3, R4 are the same or different and may be selected from alkyl radicals having 1 to 22 carbon atoms in the carbon chain, a phenyl radical or a benzyl radical, and Y is the anion of an inorganic or organic acid or a hydroxide ion.

In the case of quaternary ammonium salts, R2, R3, R4 are especially alkyl radicals having 1 to 22 carbon atoms, especially those having 1 to 12 carbon atoms, in the carbon chain and/or phenyl radicals and/or benzyl radicals preferably. Examples of quaternary ammonium salts include cetyldimethylbenzylammonium chloride, tributylbenzylammonium chloride, trimethylbenzylammonium chloride, trimethylbenzylammonium iodide, triethylbenzylammonium chloride and triethylbenzylammonium iodide. Useful quaternary phosphonium salts include, for example, triphenylbenzylphosphonium chloride or triphenylbenzylphosphonium iodide. Preference may be given to using benzyltributylammonium chloride. For quaternary phosphonium salts, R2, R3, R4 are preferably alkyl radicals having 1 to 22 carbon atoms and/or phenyl radicals and/or benzyl radicals. Useful anions include those of strong inorganic or organic acids, especially $Cl^-$, $Br^-$, $I^-$ anions, but also hydroxides, methoxides or acetates.

The phase transfer catalyst may preferably be used in the processes according to the invention in amounts of 0.01% to 15% by mass, preferably of 0.1% to 10.0% by mass and especially in amounts of 0.1% to 5.0% by mass, based on the ketone used.

The reaction may be conducted in an auxiliary solvent. Suitable solvents have been found, for example, to be methanol or ethanol. However, it is also possible to use auxiliary solvents which can likewise be converted during the reaction. One example of these is methyl ethyl ketone. More preferably, the condensation according to the present invention is effected in the presence of methanol and/or ethanol.

The reaction takes place at temperatures between 40° C. and 120° C., more preferably between 40° C. and 78° C.

The reaction may be conducted at pressures between 1.01325 bar absolute and 1.8 bar absolute, preferably at 1.01325 bar absolute.

By varying the ratios of aldehyde and ketone within the limits of the present invention, it may be possible to adjust resin properties such as glass transition temperature and molar mass.

In one preferred embodiment of the present invention, 30% aqueous formaldehyde solution may be used as aldehyde component, and 2-methylpentan-4-one as ketone component. The preferred molar ratio of ketone to aldehyde is 1:1.7 to 1:2.2. In the preferred embodiment, the phase transfer catalyst used may be benzyltributylammonium chloride. The preferred molar ratio of benzyltributylammonium chloride to 2-methylpentan-4-one is 0.1% to 0.5% by mass. The basic catalyst may preferably be sodium hydroxide solution as a 50% (w/w) solution in a preferred amount greater than 0.15 mol %, based on 2-methylpentan-4-one. The condensation may preferably be conducted in methanol as auxiliary solvent, in which case the auxiliary solvent is preferably used in an amount of more than 50 ml/mol of 2-methylpentan-4-one. The inventive product may be worked up in a conventional manner as known to the person skilled in the art, and may include distillation, separation and/or washing operations.

Since the inventive condensation resins are free-flowing at 23° C. and 101,325 Pa, they are advantageously suitable for various uses. More particularly, the inventive condensation resins are suitable as grinding resins for the production of solids dispersions with a low solvent level.

Therefore, the present invention further provides for the use of the inventive resins as pigment wetting resins and/or dispersing resins, where the pigments are especially in solventborne pigment pastes. Therefore, the inventive resins are suitable as grinding resins for solids dispersions with a low solvent level, for example based on fillers or pigments.

Compositions comprising resins according to the present invention likewise form part of the subject-matter of the present invention. More particularly, the inventive compositions additionally contain pigments. In a particularly preferred embodiment, the compositions consist of resins according to the present invention and pigments.

Preferred solids include fillers, for example talc, kaolin, silicas, barytes and lime; ceramic materials, for example aluminium oxides, silicates, zirconium oxides, titanium oxides, boron nitrides, silicon nitrides, boron carbides, mixed silicon aluminium nitrides and metal titanates; magnetic materials, for example magnetic oxides of transition metals, such as iron oxides, cobalt-doped iron oxides and ferrites; metals, for example iron, nickel, cobalt and alloys thereof, and biocide, agrochemicals and pharmaceuticals, for example fungicides.

Further preferred solids include inorganic and organic pigments. Examples of inorganic pigments are carbon blacks, titanium dioxides, zinc oxides, Prussian blue, iron oxides, cadmium sulphides, chromium pigments, for example chromates, molybdates and mixed chromates and sulphates of lead, zinc, barium, calcium and mixtures thereof. Further examples of inorganic pigments are described in "H. Endriss, Aktuelle anorganische Bunt-Pigmente [Inorganic Colour Pigments Today], Vincentz Verlag, Hannover (1997)". Examples of organic pigments include azo, diazo, condensed azo, naphthol, metal complex, thioindigo, indanthrone, isoindanthrone, anthanthrone, anthraquinone, isodibenzanthrone, triphendioxazine, quinacridone, perylene, diketopyrrolopyrrole and phthalocyanine pigments. Further examples of organic pigments are specified in "W. Herbst, K. Hunger, Industrial Organic Pigments, VCH, Weinheim (1993)".

The inventors have surprisingly and unexpectedly found that there is universal compatibility of the inventive resins with further constituents, preferably binders, of coating materials and/or adhesives and/or sealing compounds. Useful coating materials into which the inventive pigment preparations may be introduced with preference include all the solvent-containing and solvent-free systems known to those skilled in the art. These systems may, for example, include physically drying systems, oxidatively drying systems or systems that are reactive in another way in one-part or two-part varnishes.

Examples of compatible binders are long-, medium- and short-oil alkyds, self-crosslinking and 2-part acrylates, polyester-melamine systems and 2-part epoxides. The coating systems produced with the inventive grinding resin are notable for high resistance to yellowing, chemicals and corrosion, high film hardnesses and good gloss.

Therefore, the present invention likewise provides for the use of compositions according to present invention for production of solventborne varnishes and printing inks or printing varnishes and coating materials, wherein the dispersion may be added to the composition.

The test methods described above may be applied to all the embodiments of the present invention. Even without further observations, it is assumed that a skilled person will be able to utilize the above description to its widest extent. The preferred embodiments and examples are therefore to be interpreted merely as a descriptive disclosure which is by no means limiting in any way whatsoever.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly. The invention may be further illustrated by the following non-limiting examples.

EXAMPLES

Example 1

Condensation Resin of Formaldehyde and 5-methylhexan-2-one 571.0 g of 5-methylhexan-2-one, 235.8 g of p-formaldehyde (95.5%), 500 ml of methanol and 1.43 g of benzyltributylammonium chloride were initially charged in a three-neck flask with stirrer, reflux condenser and temperature probe in a nitrogen atmosphere. After heating to 40° C., the reaction was started by adding 100.0 g of sodium hydroxide solution (50% by weight). Subsequently, the reaction mixture was heated up to reflux within 2 hours. On attainment of reflux, 249.4 g of a formaldehyde solution (30% by weight in water) were added within 75 minutes, then the reaction mixture is kept under reflux for 4 hours. Then the stirrer was switched off. After the phases separated, the supernatant aqueous methanol phase was removed and the water/methanol mixture that remained was distilled. The crude product was washed five times with water. Finally, distillation was effected up to 180° C. in a water-jet vacuum.

$M_n$=590 g/mol
$M_w$=790 g/mol
Glass transition temperature −10° C.
Viscosity (93% by weight in butyl acetate) at 23° C.: 31 Pas

Example 2

Condensation Resin of Formaldehyde and heptan-2-one 571.0 g of heptan-2-one, 235.8 g of p-formaldehyde (95.5%), 250 ml of methanol and 1.43 g of benzyltributylammonium chloride were initially charged in a three-neck flask with stirrer, reflux condenser and temperature probe in a nitrogen atmosphere. After heating to 40° C., the reaction was started by adding 100.0 g of sodium hydroxide solution (50% by weight). Subsequently, the reaction mixture was heated up to reflux within 2 hours. On attainment of reflux, 249.4 g of a formaldehyde solution (30% by weight in water) were added within 60 minutes, then the reaction mixture was kept under reflux for 4 hours. Then the stirrer was switched off. After the phases separated, the supernatant aqueous methanol phase was removed and the water/methanol mixture that remained was distilled. The crude product was washed five times with water. Finally, distillation was effected up to 180° C. in a water-jet vacuum.

$M_n$=650 g/mol
$M_w$=920 g/mol
Glass transition temperature −22° C.
Viscosity (93% by weight in butyl acetate) at 23° C.: 25 Pas

Example 3

Condensation Resin of Formaldehyde and undecan-2-one 681.2 g of undecan-2-one, 188.7 g of p-formaldehyde (95.5%), 400 ml of methanol and 1.70 g of benzyltributylammonium chloride were initially charged in a three-neck flask with stirrer, reflux condenser and temperature probe in a nitrogen atmosphere. After heating to 40° C., the reaction was started by adding 80.0 g of sodium hydroxide solution (50% by weight). Subsequently, the reaction mixture was heated up to reflux within 2 hours. On attainment of reflux, 249.4 g of a formaldehyde solution (30% by weight in water) were added within 60 minutes, then the reaction mixture was kept under reflux for 4 hours. Then the stirrer was switched off. After the phases separated, the supernatant aqueous methanol phase was removed and the water/methanol mixture that remained was distilled. The crude product was washed five times with water. Finally, distillation was effected up to 180° C. in a water-jet vacuum.

$M_n$=720 g/mol
$M_w$=920 g/mol
Glass transition temperature −73° C.
Viscosity (93% by weight in butyl acetate) at 23° C.: 5 Pas

Example 4

Condensation Resin of Formaldehyde and octan-2-one 576.9 g of octan-2-one, 212.3 g of p-formaldehyde (95.5%), 450 ml of methanol and 1.44 g of benzyltributylammonium chloride were initially charged in a three-neck flask with stirrer, reflux condenser and temperature probe in a nitrogen atmosphere. After heating to 40° C., the reaction was started by adding 90.0 g of sodium hydroxide solution (50% by weight). Subsequently, the reaction mixture was heated up to reflux within 2 hours. On attainment of reflux, 224.5 g of a formaldehyde solution (30% by weight in water) were added within 60 minutes, then the reaction mixture was kept under reflux for 4 hours. Then the stirrer was switched off After the phases separated, the supernatant aqueous methanol phase was removed and the water/methanol mixture that remained was distilled. The crude product was washed five times with water. Finally, distillation was effected up to 180° C. in a water-jet vacuum.

Mn=670 g/mol
Mw=890 g/mol
Glass transition temperature −38° C.
Viscosity (93% by weight in butyl acetate) at 23° C.: 12 Pas

Example 5

Condensation Resin of Formaldehyde and 2-methylpentan-4-one 1001.6 g of 2-methylpentan-4-one, 991.0 g of formaldehyde solution (30% by weight in water), 1000 ml of methanol and 2.5 g of benzyltributylammonium chloride were initially charged in a three-neck flask with stirrer, reflux condenser and temperature probe in a nitrogen atmosphere. After heating to 40° C., the reaction was started by adding 200.0 g of sodium hydroxide solution (50% by weight). Subsequently, the reaction mixture was heated up to reflux. On attainment of reflux, 991.0 g of a formaldehyde solution (30% by weight in water) were added within 90 minutes, then the reaction mixture was kept under reflux for 5 hours. Then the stirrer was switched off. After the phases separated, the supernatant aqueous methanol phase was removed and the water/methanol mixture that remain was distilled. The crude product was washed five times with water, with addition of 12 ml of glacial acetic acid to the first wash water. Finally, distillation was effected up to 180° C. in a water jet vacuum.
Mn=490 g/mol
Mw=640 g/mol
Glass transition temperature −15° C.
Viscosity (93% by weight in butyl acetate) at 23° C.: 26 Pas

Example 6

Condensation Resin of Acetaldehyde and 2-methylpentan-4-one 1001.6 g of 2-methylpentan-4-one, 440.1 g of acetaldehyde, 1000 ml of methanol and 2.5 g of benzyltributylammonium chloride are initially charged in a three-neck flask with stirrer, reflux condenser and temperature probe in a nitrogen atmosphere. After heating to 40° C., the reaction is started by adding 200.0 g of sodium hydroxide solution (50% by weight). Subsequently, the reaction mixture is heated up to reflux. On attainment of reflux, 440.1 g of acetaldehyde are added within 90 minutes, then the reaction mixture is kept under reflux for 5 hours. Then the stirrer is switched off. After the phases have separated, the supernatant aqueous methanol phase is removed and the water/methanol mixture that remains is distilled. The crude product is washed five times with water, with addition of 12 ml of glacial acetic acid to the first wash water. Finally, distillation is effected up to 180° C. in a water-jet vacuum.
Mn=490 g/mol
Mw=720 g/mol
Glass transition temperature −10° C.
Viscosity (93% by weight in butyl acetate) at 23° C.: 35 Pas

Example 7

Condensation Resin of 2-methylpropanal and 2-methylpentan-4-one 1001.6 g of 2-methylpentan-4-one, 721.1 g of 2-methylpropanal, 1000 ml of methanol and 2.5 g of benzyltributylammonium chloride were initially charged in a three-neck flask with stirrer, reflux condenser and temperature probe in a nitrogen atmosphere. After heating to 40° C., the reaction was started by adding 200.0 g of sodium hydroxide solution (50% by weight). Subsequently, the reaction mixture was heated up to reflux. On attainment of reflux, 721.1 g of 2-methylpropanal were added within 90 minutes, then the reaction mixture was kept under reflux for 5 hours. Then the stirrer was switched off. After the phases separated, the supernatant aqueous methanol phase was removed and the water/methanol mixture that remained was distilled. The crude product was washed five times with water, with addition of 12 ml of glacial acetic acid to the first wash water. Finally, distillation was effected up to 180° C. in a water jet vacuum.
Mn=470 g/mol
Mw=680 g/mol
Glass transition temperature −19° C.
Viscosity (93% by weight in butyl acetate) at 23° C.: 29 Pas

Example 8

Condensation Resin of Butanal and 2-methylpentan-4-one 1001.6 g of 2-methylpentan-4-one, 721.1 g of butanal, 1000 ml of methanol and 2.5 g of benzyltributylammonium chloride were initially charged in a three-neck flask with stirrer, reflux condenser and temperature probe in a nitrogen atmosphere. After heating to 40° C., the reaction was started by adding 200.0 g of sodium hydroxide solution (50% by weight). Subsequently, the reaction mixture was heated up to reflux. On attainment of reflux, 721.1 g of butanal were added within 90 minutes, then the reaction mixture was kept under reflux for 5 hours. Then the stirrer was switched off. After the phases separated, the supernatant aqueous methanol phase was removed and the water/methanol mixture that remained was distilled. The crude product was washed five times with water, with addition of 12 ml of glacial acetic acid to the first wash water. Finally, distillation was effected up to 180° C. in a water-jet vacuum.
Mn=460 g/mol
Mw=640 g/mol
Glass transition temperature −24° C.
Viscosity (93% by weight in butyl acetate) at 23° C.: 23 Pas

Example 9

Condensation Resin of Dodecanal and 2-methylpentan-4-one 1001.6 g of 2-methylpentan-4-one, 1843.2 g of dodecanal, 1000 ml of methanol and 2.5 g of benzyltributylammonium chloride were initially charged in a three-neck flask with stirrer, reflux condenser and temperature probe in a nitrogen atmosphere. After heating to 40° C., the reaction was started by adding 200.0 g of sodium hydroxide solution (50% by weight). Subsequently, the reaction mixture was heated up to reflux. On attainment of reflux, 1843.2 g of dodecanal were added within 90 minutes, then the reaction mixture was kept under reflux for 5 hours. Then the stirrer was switched off After the phases separated, the supernatant aqueous methanol phase was removed and the water/methanol mixture that remained was distilled. The crude product was washed five times with water, with addition of 12 ml of glacial acetic acid to the first wash water. Finally, distillation was effected up to 180° C. in a water-jet vacuum.

Mn=380 g/mol
Mw=520 g/mol
Glass transition temperature −5° C.
Viscosity (93% by weight in butyl acetate) at 23° C.: 42 Pas

Example 10

Condensation Resin of n-pentanal and 2-methylpentan-4-one 1001.6 g of 2-methylpentan-4-one, 861.3 g of n-pentanal, 1000 ml of methanol and 2.5 g of benzyltributylammonium chloride were initially charged in a three-neck flask with stirrer, reflux condenser and temperature probe in a nitrogen atmosphere. After heating to 40° C., the reaction was started by adding 200.0 g of sodium hydroxide solution (50% by weight). Subsequently, the reaction mixture was heated up to reflux. On attainment of reflux, 861.3 g of n-pentanal were added within 90 minutes, then the reaction mixture was kept under reflux for 5 hours. Then the stirrer was switched off After the phases separated, the supernatant aqueous methanol phase was removed and the water/methanol mixture that remained was distilled. The crude product was washed five times with water, with addition of 12 ml of glacial acetic acid to the first wash water. Finally, distillation was effected up to 180° C. in a water-jet vacuum.

Mn=490 g/mol
Mw=650 g/mol
Glass transition temperature −17° C.
Viscosity (93% by weight in butyl acetate) at 23° C.: 31 Pas

Example 11

Condensation Resin of Formaldehyde and heptan-4-one 1141.9 g of heptan-4-one, 991.0 g of formaldehyde solution (30% by weight in water), 1000 ml of methanol and 2.5 g of benzyltributylammonium chloride were initially charged in a three-neck flask with stirrer, reflux condenser and temperature probe in a nitrogen atmosphere. After heating to 40° C., the reaction was started by adding 200.0 g of sodium hydroxide solution (50% by weight). Subsequently, the reaction mixture was heated up to reflux. On attainment of reflux, 991.0 g of a formaldehyde solution (30% by weight in water) were added within 90 minutes, then the reaction mixture was kept under reflux for 5 hours. Then the stirrer was switched off After the phases separated, the supernatant aqueous methanol phase was removed and the water/methanol mixture that remained was distilled. The crude product was washed five times with water, with addition of 12 ml of glacial acetic acid to the first wash water. Finally, distillation was effected up to 180° C. in a water jet vacuum.

Mn=640 g/mol
Mw=900 g/mol
Glass transition temperature −23° C.
Viscosity (93% by weight in butyl acetate) at 23° C.: 26 Pas

Example 12

Condensation Resin of Formaldehyde and octan-3-one 1282.1 g of octan-3-one, 991.0 g of formaldehyde solution (30% by weight in water), 1000 ml of methanol and 2.5 g of benzyltributylammonium chloride were initially charged in a three-neck flask with stirrer, reflux condenser and temperature probe in a nitrogen atmosphere. After heating to 40° C., the reaction was started by adding 90.0 g of sodium hydroxide solution (50% by weight). Subsequently, the reaction mixture was heated up to reflux within 2 hours. On attainment of reflux, 991.0 g of a formaldehyde solution (30% by weight in water) were added within 60 minutes, then the reaction mixture was kept under reflux for 4 hours. Then the stirrer was switched off After the phases separated, the supernatant aqueous methanol phase was removed and the water/methanol mixture that remained was distilled. The crude product was washed five times with water. Finally, distillation was effected up to 180° C. in a water-jet vacuum.

Mn=690 g/mol
Mw=920 g/mol
Glass transition temperature −39° C.
Viscosity (93% by weight in butyl acetate) at 23° C.: 10 Pas

Example 13

Condensation Resin of Formaldehyde and butan-2-one 721.1 g of butan-2-one, 991.0 g of formaldehyde solution (30% by weight in water), 1000 ml of methanol and 2.5 g of benzyltributylammonium chloride were initially charged in a three-neck flask with stirrer, reflux condenser and temperature probe in a nitrogen atmosphere. After heating to 40° C., the reaction was started by adding 100.0 g of sodium hydroxide solution (50% by weight). Subsequently, the reaction mixture was heated up to reflux within 2 hours. On attainment of reflux, 249.4 g of a formaldehyde solution (30% by weight in water) were added within 60 minutes, then the reaction mixture was kept under reflux for 4 hours. Then the stirrer was switched off. After the phases separated, the supernatant aqueous methanol phase was removed and the water/methanol mixture that remained was distilled. The crude product was washed five times with water. Finally, distillation was effected up to 180° C. in a water-jet vacuum.

Mn=620 g/mol
Mw=790 g/mol
Glass transition temperature −27° C.
Viscosity (93% by weight in butyl acetate) at 23° C.: 19 Pas

Example 14

Condensation Resin of Formaldehyde and heptan-3-one 1141.9 g of heptan-3-one, 991.0 g of formaldehyde solution (30% by weight in water), 1000 ml of methanol and 2.5 g of benzyltributylammonium chloride were initially charged in a three-neck flask with stirrer, reflux condenser and temperature probe in a nitrogen atmosphere. After heating to 40° C., the reaction was started by adding 100.0 g of sodium hydroxide solution (50% by weight). Subsequently, the reaction mixture was heated up to reflux within 2 hours. On attainment of reflux, 249.4 g of a formaldehyde solution (30% by weight in water) were added within 60 minutes, then the reaction mixture was kept under reflux for 4 hours. Then the stirrer was switched off. After the phases separated, the supernatant aqueous methanol phase was removed and the water/methanol mixture that remained was distilled. The crude product was washed five times with water. Finally, distillation was effected up to 180° C. in a water-jet vacuum.

Mn=650 g/mol
Mw=920 g/mol
Glass transition temperature −24° C.
Viscosity (93% by weight in butyl acetate) at 23° C.: 22 Pas Example 15

Condensation Resin of Formaldehyde, 2-methylpentan-4-one and methyl ethyl ketone 408.8 g of 2-methylpentan-4-one, 72.1 g of methyl ethyl ketone, 235.8 g of p-formaldehyde (95.5%), 500 ml of methanol and 1.20 g of benzyltributylammonium chloride were initially charged in a three-neck flask with stirrer, reflux condenser and temperature probe in a nitrogen atmosphere. After heating to 40° C., the reaction was started by adding 20.0 g of sodium hydroxide solution (50% by weight). Subsequently, the reaction mixture was heated up to reflux. On attainment of reflux, 249.4 g of a formaldehyde solution (30% by weight in water) were added within 60 minutes, then the reaction mixture was kept under reflux for 4 hours. Then the stirrer was switched off. After the phases separated, the supernatant aqueous methanol phase was removed and the water/methanol mixture that remained was distilled. The crude product was washed five times with water. Finally, distillation was effected up to 180° C. in a water-jet vacuum.

Mn=540 g/mol
Mw=710 g/mol
Glass transition temperature −1° C.
Viscosity (93% by weight in butyl acetate) at 23° C.: 50 Pas Example 16

Condensation Resin of Formaldehyde and 2-methylpentan-4-one 1001.6 g of 2-methylpentan-4-one, 991.0 g of formaldehyde solution (30% by weight in water), 1000 ml of ethanol and 2.5 g of benzyltributylammonium chloride were initially charged in a three-neck flask with stirrer, reflux condenser and temperature probe in a nitrogen atmosphere. After heating to 40° C., the reaction was started by adding 200.0 g of sodium hydroxide solution (50% by weight). Subsequently, the reaction mixture was heated up to reflux. On attainment of reflux, 991.0 g of a formaldehyde solution (30% by weight in water) were added within 90 minutes, then the reaction mixture was kept under reflux for 5 hours. Then the stirrer was switched off. After the phases separated, the supernatant aqueous ethanol phase was removed and the water/ethanol mixture that remained was distilled. The crude product was washed five times with water, with addition of 12 ml of glacial acetic acid to the first wash water. Finally, distillation was effected up to 180° C. in a water jet vacuum.

Mn=480 g/mol
Mw=620 g/mol
Glass transition temperature −13° C.
Viscosity (93% by weight in butyl acetate) at 23° C.: 27 Pas Noninventive Example 1

Condensation Resin of Formaldehyde and Cyclohexanone 981.5 g of cyclohexanone, 220.1 g of p-formaldehyde (95.5%) and 1250 ml of methanol were initially charged in a three-neck flask with stirrer, reflux condenser and temperature probe in a nitrogen atmosphere. After heating to 40° C., the reaction was started by adding 80.0 g of sodium hydroxide solution (50% by weight). Subsequently, the reaction mixture was heated up to reflux within 2 hours. On attainment of reflux, 700.7 g of a formaldehyde solution (30% by weight in water) were added within 60 minutes, then the reaction mixture was kept under reflux for 4 hours. Then the stirrer was switched off. After the phases separated, the supernatant aqueous methanol phase was removed and the water/methanol mixture that remained was distilled. The crude product was washed five times with water. Finally, distillation was effected up to 180° C. in a water jet vacuum.

Mn=580 g/mol
Mw=1000 g/mol
Glass transition temperature 85° C.
Viscosity (93% by weight in butyl acetate) at 23° C.: solid Noninventive Example 2

Condensation Resin of Formaldehyde and Methyl Isobutyl Ketone 1001.6 g of methyl isobutyl ketone, 408.8 g of p-formaldehyde (95.5%), 1250 ml of methanol and 5.0 g of benzyltributylammonium chloride were initially charged in a three-neck flask with stirrer, reflux condenser and temperature probe in a nitrogen atmosphere. After heating to 40° C., the reaction was started by adding 80.0 g of sodium hydroxide solution (50% by weight). Subsequently, the reaction mixture was heated up to reflux within 2 hours. On attainment of reflux, 1251.3 g of a formaldehyde solution (30% by weight in water) were added within 60 minutes, then the reaction mixture was kept under reflux for 4 hours. Then the stirrer was switched off. After the phases separated, the supernatant aqueous methanol phase was removed and the water/methanol mixture that remained was distilled. The crude product was washed five times with water. Finally, distillation was effected up to 180° C. in a water-jet vacuum.

Mn=650 g/mol
Mw=830 g/mol
Glass transition temperature 48° C.
Viscosity (93% by weight in butyl acetate) at 23° C.: solid Performance Properties of the Grinding Resins Film Hardness The film hardness that resulted when the grinding resins were used was assessed in a two-part varnish system. To produce this test system, 65.2 g of Setalux® A HS 1170 BA (70% in butyl acetate, polyol from Nuplex) were mixed with 1.8 g of TIB KAT® 716 (1% in butyl acetate, catalyst from TIB Chemicals AG), 3.0 g of xylene, 3.0 g of methoxypropyl acetate, 3.0 g of butyl acetate and 0.1 g of TEGO® Flow 425

(surface additive from Evonik Industries AG). Shortly before application, 23.9 g of Desmodur® N 3390 BA (isocyanate hardener from Bayer® Material Science AG) were added as hardener, and stirred in well.

To test the film hardness, all the grinding resins are pre-dissolved in an 80% solution in butyl acetate. Then 13.32 g of varnish base were mixed with 2.5 g of resin solution, 4.18 g of hardener were added and the mixture was mixed again. The samples were applied to a glass plate with a 150 pm applicator frame, and dried at room temperature for 24 hours and then in an oven at 80° C. for 2 hours.

The hardness of the varnish films was determined to DIN 53 157 with an Erichsen 299/300 pendulum damping tester.

Yellowing Behaviour

The yellowing behaviour of the grinding resins was tested in a baking varnish system. To produce the white primer, 35.0 g of Dynapol LH 832-02, 65% in Solvesso 150/BG, 0.2 g of Aerosil 200, 30.0 g of 2310 titanium dioxide (from Kronos), 5.0 g of Solvesso 200 and 4.8 g of butyldiglycol were introduced into a glass powder flask together with 150 g of glass beads (diameter 3 mm), and dispersed by a Lau DAS H 200-K disperser for 45 minutes.

Thereafter, 8.0 g of Dynapol LH 832-02, 65% in Solvesso 150/BG, 6.0 g of Cymel 303 (melamine resin from Cytec), 1.0 g of Nacure 1419 (catalyst from Worlee Chemie), 1.0 g of Resiflow FL 2 (surface additive from Worlee Chemie) and 9.0 g of butylglycol were added. The mixture was homogenized by the Lau DAS H 200¬K disperser for another 5 minutes.

This primer is applied with a 150 pm applicator frame to Chemetall Gardobond 722 30 W OF test substrates and dried at room temperature for 10 minutes and then in an oven at 150° C. for 40 minutes.

To produce the clearcoat, 60.5 g of Setal 1603 BA-78, 76% (polyol from Nuplex), 16.5 g of Maprenal MF 927, 70% in isobutanol (melamine resin from Ineos Melamines), 11.5 g of xylene and 11.5 g of butyl acetate were mixed well.

2.9 g of each of the dispersing resins (if they are in 100% purity, or a greater amount with a corresponding resin solids content if they are in dissolved form) are added to 50.0 g of this test varnish and homogenized thoroughly.

The samples were applied with a 150 µm applicator frame to the Chemetall Gardobond 722 W OF test substrates which had been primed with white primer, and dried at room temperature for 10 minutes and then in an oven at 180° C. for 30 minutes.

The samples were characterized by colorimetry by an X-Rite SP 60 spectrophotometer, then subjected once again to thermal stress at 180° C. in an oven for 60 minutes, cooled and then characterized by colorimetry again.

Compatibility with Paint Binders

To test compatibility, various paint binders—here, WorléeKyd S 3001, 75% in xylene/MOP 8:2 (alkyd resin from Worlee-Chemie), Alkydal F 681 TB, 75% in petroleum spirit (alkyd resin from Nuplex), WorléeKyd SD 7003, 85% in dearomatized HC 160-200 (alkyd resin from Worlee-Chemie), Synthalat A 086 HS, 75% in butyl acetate (acrylate resin from Synthopol), Viacryl SC 444/50 BSNB, 50% in butanol, Solvent naphtha 180/210 (acrylate resin from Cytec) and Dynapol LH 830¬02, 60% in Solvent naphtha 150/butylglycol (Polyester from Evonik)—were first diluted to a resin content of 60% with butyl acetate/methoxypropyl acetate (in a ratio of 1:1). Then 3.0 g of each of the dispersing resins were added to 100.0 g of these resin solutions in one batch, and 18.0 g of each of the dispersing resins in another batch (if they are in 100% purity, or a greater amount with a corresponding resin solids content if they were in dissolved form). The liquids were stirred together by means of a magnetic stirrer without heating for 10 minutes.

Thereafter, the mixtures were drawn down onto glass plates with a 200 µm applicator frame and dried at 60° C. for 2 hours. After cooling to room temperature, the drawdown on the glass plate was assessed. The mixture in the glass bottle was assessed after 24 hours.

The assessment was conducted using the following scheme:

Clear liquid, clear film=>rated+(compatible)

Cloudy liquid, cloudy film=>rated−(incompatible)

Behaviour in Pigment Concentrates

The performance properties of the grinding resins were also assessed in pigment concentrates having the following formulations:

1) Pigment Concentrate Based on an Iron Oxide Yellow Pigment (CI PY 42)

In a 250 ml screwtop bottle, 75.0 g of Bayferrox 3920 (from Bayer), 60 g of the 93% dissolved forms of the grinding resins in butyl acetate, suitable dispersing additives in a dosage of 7% active substance based on pigment and butyl acetate were initially charged in the amount required to attain 150.0 g, and homogenized by means of a laboratory spatula. To this mixture were added 150.0 g of glass beads (diameter 2-2.3 mm), and the mixture was homogenized again and dispersed in a Lau FAS 500 paint mixer for 1 hour. The formulations obtained were separated from the glass beads by disposable filters.

2) Pigment Concentrate Based on a Phthalocyanine Blue Pigment (CI PB 15:3)

In a 250 ml screwtop bottle, 30.0 g of Heliogen Blau L 7085 F (from BASF), 47.0 g of the 93% dissolved forms of the grinding resins in butyl acetate, suitable dispersing additives in a dosage of 20% active substance based on pigment and butyl acetate were initially charged in the amount required to attain 100.0 g, and homogenized by a laboratory spatula. To this mixture were added 200 g of glass beads (diameter 2-2.3 mm), and the mixture was homogenized again and dispersed in a Lau FAS 500 paint mixer for 2 hours. The formulations obtained were separated from the glass beads by disposable filters.

3) Pigment Concentrate Based on a Carbon Black Pigment (CI PB 7)

In a 250 ml screwtop bottle, 21.0 g of Spezialschwarz 6 specialty carbon black (from), 52.0 g of the 93% dissolved forms of the grinding resins in butyl acetate, suitable dispersing additives in a dosage of 40% active substance based on pigment and butyl acetate were initially charged in the amount required to attain 100.0 g, and homogenized by a laboratory spatula. To this mixture are added 200 g of glass beads (diameter 2-2.3 mm), and the mixture is homogenized again and dispersed in a Lau FAS 500 paint mixer for 2 hours. The formulations obtained are separated from the glass beads by means of disposable filters.

The pigment concentrates obtained were characterized in terms of rheology of an Anton Paar MCR 301 rheometer.

With the dispersing resins described, the following results were obtained compared to comparative products standard on the market:

| | Compatabilites | | | | | Yellowing test delta E | 2K-PU final hardness Pendulum damping | Bayferrox 3920 concentrate Viscosity/ mPas (D = 100 1/s) | Heliogen blue L 7085 concentrate Viscosity/ mPas (D = 100 1/s) | Spezialschwarz 6 Viscosity/ mPas (D = 100 1/s) |
| | Alkyd resins | | Acrylic resins | | PES | | | | | |
| | Worlee-Kyd S 3001 | Alkydal F 681 TB | Worlee-Kyd SD 7003 | Synthalat A 086 HS | Viacryl SC 444/50 BSNB | Dynapol LH 830-02 | | | | | |
|---|---|---|---|---|---|---|---|---|---|---|---|
| Laropal A 81 (from BASF) | + | + | + | + | + | + | <2.5 | 90 | not producible | not producible | not producible |
| Example 1 | + | + | + | + | + | + | <2.5 | 91 | 5800 | 5860 | 2820 |
| Example 2 | + | + | + | + | + | + | <2.5 | 92 | 9100 | 4770 | 2500 |
| Example 3 | + | + | + | + | + | − | <2.5 | 88 | 3200 | 4950 | 2140 |
| Example 4 | + | + | + | + | + | + | <2.5 | 89 | 5100 | 4320 | 2480 |
| Example 5 | + | + | + | + | + | + | <2.5 | 93 | 5600 | 5250 | 2710 |
| Example 6 | + | + | + | + | + | − | <2.5 | 92 | 5750 | 5870 | 2860 |
| Example 7 | + | + | + | + | + | + | <2.5 | 92 | 8700 | 4970 | 2520 |
| Example 8 | + | + | + | + | + | + | <2.5 | 90 | 7100 | 4640 | 2630 |
| Example 9 | + | + | + | + | + | + | <2.5 | 93 | 14950 | 6770 | 2760 |
| Example 10 | + | + | + | + | + | + | <2.5 | 90 | 5460 | 5060 | 2620 |
| Example 11 | + | + | + | + | + | + | <2.5 | 92 | 7100 | 4830 | 2390 |
| Example 12 | + | + | + | + | + | + | <2.5 | 89 | 5050 | 4180 | 2420 |
| Example 13 | + | + | + | + | + | + | <2.5 | 89 | 6300 | 4520 | 2670 |
| Example 14 | + | + | + | + | + | + | <2.5 | 91 | 8950 | 4630 | 2400 |
| Example 15 | + | + | + | + | + | + | <2.5 | 90 | 25100 | 7620 | 2990 |
| Example 16 | + | + | + | + | + | + | <2.5 | 93 | 5700 | 5350 | 2790 |
| Non-inventive Example 1 | + | + | + | + | + | + | <2.5 | 90 | not producible | not producible | not producible |
| Non-inventive Example 2 | + | + | + | + | + | + | <2.5 | 90 | not producible | not producible | not producible |
| VariPlus UC (from Evonik) | + | + | − | + | + | + | 7.5 | 70 | 4020 | 4820 | 2000 |

The invention claimed is:

1. A ketone-aldehyde condensation resin, comprising:
    a condensation product of an aliphatic ketone and an aldehyde;
    wherein
    the aldehyde is at least one selected from the group consisting of formaldehyde, acetaldehyde, n-butyraldehyde, isobutyraldehyde, amylaldehyde and dodecanal,
    the ketone is at least one selected from the group consisting of heptan-2-one, heptan-3-one, heptan-4-one, octan-2-one, undecan-2-one, 5-methylhexan-2-one and 2-methylpentan-4-one,
    a molar ratio of the aliphatic ketone to the aldehyde is from 1/1.5 to 1/2.5, and
    the condensation resin is free-flowing at a temperature of 2.3° C. and a pressure of 101,325 Pa.

2. The ketone-aldehyde condensation resin of claim 1, wherein the aldehyde comprises formaldehyde.

3. The ketone-aldehyde condensation resin of claim 1, wherein a glass transition temperature is 0° C. or less.

4. A process for preparing the ketone-aldehyde condensation resin of claim 1, comprising:
    condensing the aliphatic ketone with the aldehyde with an alkaline catalyst;
    wherein a molar ratio of the aliphatic ketone to the aldehyde is from 1/1.5 to 1/2.5.

5. The process for preparing the ketone-aldehyde condensation resin of claim 4,
    wherein the alkaline catalyst is an alkali metal hydroxide or alkali metal methoxide.

6. The process for preparing the ketone-aldehyde condensation resin of claim 4,
    wherein the condensation is conducted in the presence of a phase transfer catalyst.

7. The process for preparing the ketone-aldehyde condensation resin of claim 6,
    wherein the phase transfer catalyst is a quaternary ammonium salt or a quaternary phosphonium salt.

8. The process for preparing the ketone-aldehyde condensation resin of claim 6,
    wherein a content of the phase transfer catalyst is from 0.01 to 15% by mass based on the mass of the aliphatic ketone.

9. The process for preparing the ketone-aldehyde condensation resin of claim 4,
    wherein a condensation mixture comprises methanol and/or ethanol.

10. The process for preparing the ketone-aldehyde condensation resin of claim 9, further comprising removing the methanol and/or ethanol from the condensation mixture when the condensation of the aliphatic ketone and the aldehyde is complete.

11. A pigment dispersion comprising:
    a pigment; and
    the ketone-aldehyde condensation resin of claim 1.

12. The pigment dispersion of claim 11, further comprising at least one selected from the group consisting of a binder, a coating material, an adhesive and a sealing compound.

13. A composition comprising the pigment dispersion of claim 11, wherein the composition is a solventborne varnish, a solventborne printing ink or a printing varnish.

14. A method for preparing a pigment dispersion, comprising adding the ketone-aldehyde condensation resin of claim 1 to the pigment dispersion prior to grinding, during grinding or after grinding of the pigment.

* * * * *